United States Patent
Strandjord et al.

(10) Patent No.: US 11,204,246 B1
(45) Date of Patent: Dec. 21, 2021

(54) SYSTEMS AND METHODS TO REDUCE DIFFERENTIAL HARMONICS OF RESONANCE TRACKING MODULATION IN A RESONANT FIBER OPTIC GYROSCOPE

(71) Applicant: Honeywell International Inc., Morris Plains, NJ (US)

(72) Inventors: Lee K. Strandjord, Tonka Bay, MN (US); Norman Gerard Tarleton, Glendale, AZ (US); Chuck Croker, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/900,419

(22) Filed: Jun. 12, 2020

(51) Int. Cl.
G01C 19/72 (2006.01)

(52) U.S. Cl.
CPC ......... G01C 19/727 (2013.01); G01C 19/721 (2013.01)

(58) Field of Classification Search
CPC .......................... G01C 19/721; G01C 19/727
See application file for complete search history.

(56) References Cited

U.S. PATENT DOCUMENTS

| 4,828,389 | A | 5/1989 | Gubbins et al. |
| 9,001,336 | B1 * | 4/2015 | Qiu ....................... G01C 19/727 356/461 |
| 9,587,945 | B2 | 3/2017 | Strandjord et al. |
| 2013/0057870 | A1 | 3/2013 | Strandjord et al. |
| 2013/0107271 | A1 * | 5/2013 | Strandjord ........... G01C 19/727 356/461 |
| 2014/0369699 | A1 * | 12/2014 | Strandjord ........... H04B 10/548 398/187 |
| 2017/0146346 | A1 * | 5/2017 | Strandjord ........... G01C 19/721 |
| 2020/0025568 | A1 | 1/2020 | Strandjord et al. |
| 2020/0072608 | A1 | 3/2020 | Strandjord et al. |

FOREIGN PATENT DOCUMENTS

CN 102650526 B 10/2014

OTHER PUBLICATIONS

Strandjord, Lee K. et al., "System and Method for Narrow Band Negative Feedback Control", U.S. Appl. No. 16/353,443, filed Mar. 14, 2019, pp. 1-23, Published: US.
Chang et al. "Resonance asymmetry phenomenon in waveguide-type optical ring resonator gyro", Optics Communications 285, pp. 1134 through 1139, Nov. 28, 2011, Elsevier.

(Continued)

*Primary Examiner* — Michael A Lyons
(74) *Attorney, Agent, or Firm* — Fogg & Powers LLC

(57) ABSTRACT

Systems and methods are provided to reduce at least one differential harmonics of a resonance tracking modulation in a resonant fiber optic gyroscope (RFOG). The fundamental frequency of the resonance tracking modulation of each of the clockwise and counter clockwise optical signals is substantially identical; however, the amplitude and phase of the Nth harmonic of a clockwise (CW) resonance tracking modulation and the Nth harmonic of a clockwise (CCW) resonance tracking modulation may differ due to non-linearities in the RFOG. Embodiments of the invention diminish, e.g., reduce to zero such vectoral difference. Differential harmonics may be generated at one or more harmonics.

20 Claims, 6 Drawing Sheets

(56) References Cited

OTHER PUBLICATIONS

Chen et al. "Offset errors caused by the resonance asymmetry in the waveguide-type optical passive resonator gyro", 21st International Conference on Optical Fiber Sensors, 2011, pp. 1 through 4, vol. 7753, Proc. of SPIE.
European Patent Office, "Extended European Search Report from EP Application No. 21166799.3", from Foreign Counterpart to U.S. Appl. No. 16/900,419, dated Sep. 15, 2021, pp. 1 through 9, Published: EP.

* cited by examiner

SYSTEMS AND METHODS TO REDUCE DIFFERENTIAL HARMONICS OF RESONANCE TRACKING MODULATION IN A RESONANT FIBER OPTIC GYROSCOPE

STATEMENT REGARDING FEDERALLY SPONSORED RESEARCH OR DEVELOPMENT

This invention was made with Government support under Government Contract Number FA9453-18-C-045 awarded by AFRL. The Government has certain rights in the invention.

BACKGROUND

The resonant fiber optic gyroscope (RFOG) shows promise of meeting challenging demands of a large number of inertial guidance applications. To meet cost and size requirements, much of the RFOG laser source optical functions may be employed with silicon photonics (SiP) chip technology. Many of the optical functions of integrated components of the SiP (such as waveguides, optical couplers and splitters, intensity modulators, and photodiodes) can perform just as well or even better than their discrete optical device counterparts. However, a satisfactory optical phase or frequency modulator(s) are difficult to implement in silicon while meeting harmonic distortion requirements because of the silicon frequency/phase modulators inherent nonlinearity. Such non-linearity generates spurious signals which generate error when determining RFOG rotation rate.

SUMMARY

The following summary is made by way of example and not by way of limitation. It is merely provided to aid the reader in understanding some of the aspects of the subject matter described. A method for diminishing differential harmonics of common resonance tracking modulation in a resonant fiber optic gyroscope is provided. The method comprises: modulate the common resonance tracking modulation on a first optical signal and a second optical signal; receive a beat note electrical signal, where the beat note electrical signal is created from a beat note of a first optical signal generated by a first optical laser and a second optical signal generated by a second laser; generate at least one differential harmonic alternating current (AC) error signal; generate at least one error cancellation signal using, where each error cancellation signal is generated using a corresponding differential harmonic AC signal, and where each error cancellation signal and its corresponding differential harmonic AC signal correspond to a differential harmonic desired to be diminished; and add the at least one error cancellation signal to an offset frequency signal to the differential harmonics, where the offset frequency signal comprises a frequency used to tune a carrier frequency of one of the first optical signal and the second optical signal to a resonant frequency in respectively one of the first direction and the second direction; wherein each differential harmonic of the common resonance tracking modulation is a vectoral difference between a harmonic of common resonance tracking modulation of the first optical signal and a same harmonic of common resonance tracking modulation of the second optical signal, and where a harmonic may be a fundamental frequency.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
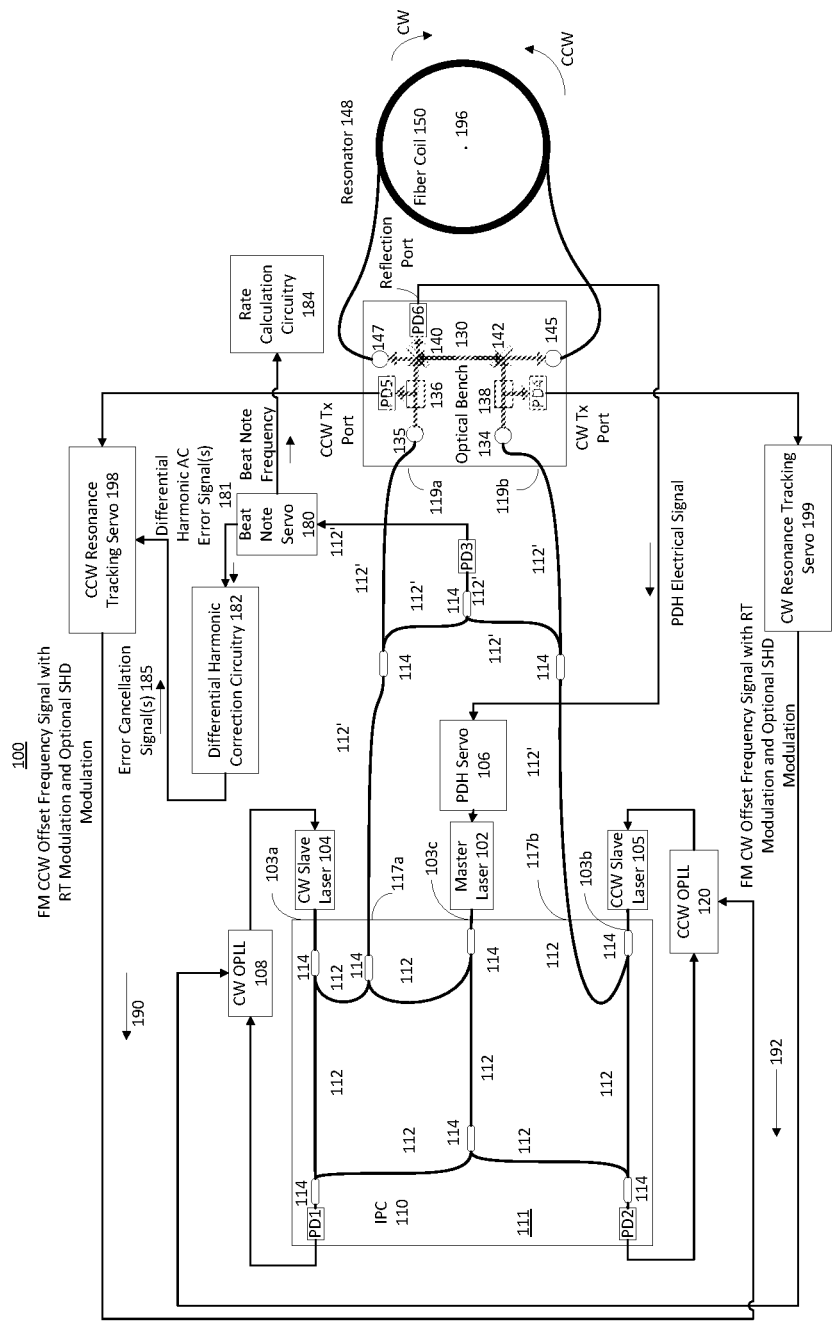
FIG. 1 illustrates a block diagram of one embodiment of a resonator fiber optic gyroscope configured to reduce differential harmonics.

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense. Also, it will be understood that when a device or signal is referred to as being "coupled" to an element, it can be coupled directly to the element, or intervening elements may also be present.

Embodiments provide systems and methods to reduce at least one differential harmonics in a resonant fiber optic gyroscope. Harmonic means a fundamental or higher order harmonic frequency. Each differential harmonic of a resonance tracking modulation (or differential harmonic) in an RFOG means a vectoral difference between a harmonic of resonance tracking modulation of a clockwise (CW) optical signal and a same harmonic of the resonance tracking modulation of a counter clockwise (CCW) optical signal, and where a harmonic may be a fundamental frequency. Each of the CW resonance tracking modulation and the CCW resonance tracking modulation comprise a signal having an amplitude, a phase, and a fundamental frequency. The fundamental frequency of the resonance tracking modulation of each of the CW and CCW optical signals is substantially identical; however, the amplitude and phase of the Nth harmonic of a clockwise (CW) resonance tracking modulation and the Nth harmonic of a counter clockwise (CCW) resonance tracking modulation may differ due to non-linearities described elsewhere herein. Embodiments of the invention diminish, e.g., reduce to zero such vectoral difference. Differential harmonics may be generated at one or more harmonics. Differential harmonics may be generated, for example, by pick-up, frequency dependent gain, and non-linearities in the RFOG (e.g., due to phase modulator(s)). Resonance tracking modulation means modulation applied to a CW optical signal and a modulation applied to a CCW optical signal to permit detection of a resonance in a direction that the CW optical signal propagates in a resonator of the RFOG and detection of a resonance in a direction that the CCW optical signal propagates in the resonator. Common resonance tracking modulation means the modulation frequency applied (by frequency or phase modulation) to the CW optical signal and the modulation frequency applied (by frequency or phase modulation) to the CCW optical signal are the same, i.e. the same frequency. The resonance tracking modulation used herein is common resonance tracking modulation.

FIG. 1 illustrates a block diagram of one embodiment of a resonator fiber optic gyroscope 100 configured to reduce differential harmonics. Reduction of differential harmonics is facilitated by a beat note servo (or beat note servo circuitry) 180 and a differential resonance tracking modulation error reduction circuitry (or differential harmonic correction circuitry) 182. The differential harmonic correction circuitry 182 generates at least one error cancellation signal (error cancellation signal(s)) 185 which diminishes, e.g., cancels, one or more differential harmonics generated elsewhere in the RFOG 100.

The exemplary RFOG 100, illustrated in FIG. 1, includes a master laser 102, a clockwise (CW) slave laser 104, a counterclockwise (CCW) slave laser 105, integrated photonics circuitry (IPC) 110, an optical bench (or optical bench circuitry) 130, a CW optical phase lock loop (CW OPLL) (or CW OPLL circuitry) 108, CCW optical phase lock loop (CCW OPLL) (or CCW OPLL circuitry) 120, a Pound-Drever-Hall (PDH) servo (or PDH servo circuitry) 106, a beat note servo (or beat note servo circuitry) 180, the differential harmonic correction circuitry 182, rate calculation circuitry 184, an optical fiber coil (fiber coil) 150, a CCW resonance tracking servo (or CCW resonance tracking servo circuitry) 198, and CW resonance tracking servo (or CW resonance tracking servo circuitry) 199. This illustrated embodiment is described for pedagogical purposes, and the embodiments of the invention can be implemented using systems with configurations which differ from the configuration illustrated in FIG. 1. Signals emitted by the CW slave laser 104, the CCW slave laser 105, and the master laser 102 may be referred to herein respectively as the CW optical signal, the CCW optical signal, and the master optical signal.

For example, the photonics circuitry of the integrated photonics circuitry 110 and the optical bench 130 are each integrated; however, in other embodiments, the photonics circuitry of the integrated photonics circuitry 110 and/or the optical bench 130 may be implemented in discrete form. Thus, the integrated photonics circuitry 110 may be just photonics circuitry in discrete form. Integrated means formed on a common substrate, e.g., comprised of a semiconductor and/or an insulator; for example, the substrate may be a doped or undoped semiconductor.

Further, the RFOG architecture of FIG. 1 is just one architecture which can be used with the techniques described herein to reduce differential harmonics. For example, the architecture illustrated in FIG. 2 of U.S. Pat. No. 9,587,945 may be used in the alternative. For example, a beat note servo could be coupled to outputs of the phase modulators 242, 246, and a differential harmonic correction circuitry (coupled to the beat note servo) could be coupled to one of the resonance tracking electronics 268, 274—of U.S. Pat. No. 9,587,945. U.S. Pat. No. 9,587,945 is incorporated by reference herein in its entirety.

The integrated photonics circuitry 110 integrates waveguides 112, waveguide beam splitters 114, a first photodetector PD1, and a second photodetector PD2 on a substrate 111. Optionally, the substrate is a semiconductor or insulator, and the waveguides 112, the waveguide beam splitters 114, the first photodetector PD1, and a second photodetector PD2 are formed from a semiconductor. Optionally, silicon may be used as the semiconductor material. Each of the waveguide beam splitters 114 may function as a beam splitter and/or as a beam combiner. Note, embodiments of the invention may use waveguide beam splitter(s) 114 which are not part of the integrated photonics circuitry 110. Photodetectors described herein may be implemented by photodiodes or other suitable components.

The integrated photonics circuitry 110 is configured to direct optical signals generated by the respectively the master laser 102, the CW slave laser 104 and the CCW slave laser 105 through the integrated photonics circuitry 110 to the first photodetector PD1, the second photodetector PD2, and external circuitry (subsequently described). The CW slave laser 104, the CCW slave laser 104, and the master laser 102 are coupled respectively to the integrated photonics circuitry 110 through a first input 103a, a second input 103b, and a third input 103c of the integrated photonics circuitry 110. A first output 117a and a second output 117b of the integrated photonics circuitry 110 are configured to be coupled—through optical waveguide 112' (e.g., optical fiber) and waveguide beam splitters 114—to respectively a first input 119a and a second input 119b of the optical bench 130; thus, the first output 117a and the second output 117b are configured to provide respectively the optical signal from the CW slave laser 104 and the optical signal from the master laser 102, and an optical signal from the CCW slave laser 105, to respectively the first input 119a and the second input 119b of the optical bench 130. The first output 117a and the second output 117b of the integrated photonics circuitry 110 are also configured to be coupled, through waveguide beam splitter 114, to a third photo detector PD3; thus, the first output 117a and the second output 117b are configured to provide portions of the optical signals from the CW slave laser 104, the master laser 102, and the CCW slave laser 105 to the photodetector PD3. An electrical output of the third photodetector PD3 is configured to provide an electrical signal (proportional to the optical power incident upon the third photodetector PD3) to an input of the beat note servo 180. Optionally, in alternative to the embodiment illustrated in FIG. 1, the optical signal from the master laser 102 is not combined with the optical signal of the CW slave laser 104 in the IPC 110 so that the optical signal of the master laser 102 is not received by third photodetector PD3, but rather the optical signal of the master laser 102 is combined with the optical signal of the CW slave laser 104 prior to being input to the optical bench 130 at the first input 119a so that the optical signal from the master laser 102 is not received by the third photodetector PD3 and the beat note servo 180.

The first photodetector PD1 is configured to receive (through optical waveguides 112 and waveguide beam splitters 114) portions of the optical signal generated by the master laser 102 and the optical signal generated by the CW slave laser. The second photodetector PD2 is configured to receive (through optical waveguides 112 and waveguide beam splitters 114) portions of the optical signal generated by the master laser 102 and the optical signal generated by the CCW slave laser 105. An electrical output of the first photodetector PD1 is configured generate an electrical signal having an amplitude proportional to the optical power incident upon the first photodetector PD1. The electrical signal generated by the first photodetector PD1 is configured to be combined at the CW OPLL 108 with a CW offset frequency signal 192 generated by the CW resonance tracking servo 199. The CW OPLL 108 controls a carrier frequency of the optical signal emitted by the CW slave laser 104. An electrical output of the second photodiode PD2 is configured generate an electrical signal having an amplitude proportional to the optical power incident upon the second photodetector PD2. The electrical signal generated by the second photodetector PD2 is configured to be combined at the CCW OPLL 120 with a CCW offset frequency signal 190 generated by the CCW resonance tracking servo 198. The CCW OPLL 120 controls a carrier frequency of the optical signal emitted by the CCW slave laser 105.

The CCW offset frequency signal 192 and the CW offset frequency signal 190 each comprise a frequency used to tune respectively the CCW slave laser 105 and the CW slave laser 104 so that the carrier frequencies of the optical signals of the CCW slave laser 105 and the CW slave laser 104 are tuned to respectively CCW and CW resonant frequencies of a resonator 148 formed by the optical fiber coil 150 and a portion of the optical bench 130 allowing optical signals to circulate through ports of the optical fiber coil 150 coupled to the optical bench 130. If optional Sideband Heterodyne Detection (SHD) modulation (described elsewhere herein) is used, then the carrier frequencies of the optical signals of the CCW slave laser 105 and the CW slave laser 104 are tuned to either respective CCW and CW resonant frequencies of a resonator 148 or substantially in the middle of two adjacent resonances in each of the CCW and CW paths of the resonator 148.

The optical bench 130 couples optical signals into and out of the resonator 148, and completes the resonator 148, e.g., with free-space optical components. Components of the optical bench 130 may be integrated on a substrate (as discussed elsewhere herein) and/or may be discrete implementations.

The embodiment of the optical bench illustrated in FIG. 1 comprises a first collimating lens 135, a second collimating lens 134, a first optical circulator 136, a second optical circulator 138, a first mirror 140, a second mirror 142, a third collimating lens 147, a fourth collimating lens 145, a fourth photodetector PD4, a fifth photodetector PDS, and a sixth photodetector. Each collimating lens, for example, may be a ball lens. The optical bench may be implemented in other ways.

The beat note servo 180 is configured to generate at at least one output at least one differential harmonic alternating current (AC) error signal (differential harmonic AC error signal(s)) 181. Optionally, the beat note servo 180 is also configured to generate at least one output at the beat note frequency. The differential harmonic AC error signal(s) 181 comprise a differential harmonic AC error signal for each differential harmonic.

The differential harmonic correction circuitry 182 is configured to receive the generated differential harmonic AC error signal(s) 181, and to generate at least one error cancellation signal (error cancellation signal(s)) 185 used to suppress one or more differential harmonics. Each error cancellation signal (of the error cancellation signal(s) 185) is intended to diminish, e.g., cancel, a corresponding differential harmonic for which a corresponding differential harmonic correction circuitry (of the differential harmonic correction circuitry) is designed to diminish. Each error cancellation signal comprises a tone having a corresponding frequency, amplitude, and phase. Each error reduction circuit (of the differential harmonic correction circuitry) is used to generate a unique error cancellation signal used to cancel a unique differential harmonic.

A resonance tracking servo, e.g., the CCW resonance tracking servo 198, is configured to receive the at least one error cancellation signal 185 and to add the at least one error cancellation signal 185 to a corresponding offset frequency signal (e.g., CCW offset frequency signal 190), a resonance tracking (RT) modulation signal, and optionally a SHD modulation signal. The CW offset frequency signal 192 and the CCW offset frequency signal 190, generated respectively by the CW resonance tracking servo 199 and the CCW resonance tracking servo 198, are used to adjust the carrier frequency of respectively the CW slave laser 104 and the CCW slave laser 105.

Thus, the CCW offset frequency signal 190 also comprises the error cancellation signal(s) 185 which diminish, e.g., cancel, one or more differential harmonics in the resonance tracking modulation. Although FIG. 1 illustrates that the error cancellation signal(s) 185 is included in the CCW offset frequency signal 190, alternatively the error cancellation signal(s) 185 can be included in the CW offset frequency signal 192 instead of the CCW offset frequency signal 190; thus, the differential harmonic correction circuitry 182 is coupled to the CW resonance tracking servo 199 instead of the CCW resonance tracking servo 198. The error cancellation signal(s) 185 may be added to either a frequency of the CCW offset frequency signal 190 or a frequency of the CW offset frequency signal 192 with a signal combiner (or signal combiner circuitry), e.g., an adder (or adder circuitry); the signal combiner may optionally be located in the corresponding resonance tracking servo.

Optical signals from the CW slave laser 104 and the master laser 102 (coupled through optical waveguide 112') are collimated by a first collimating lens 135 and are directed towards the first optical circulator 136. Mirrors described herein are partially reflective, and thus partially transmissive. Optionally, the mirrors may reflect ninety-nine percent of incident energy and transmit one percent of the incident energy; however, each mirror may have a different proportion of reflected and transmitted energy.

The electrical output of the fifth photodetector PD5 is configured to provide an electrical signal proportional to the optical power incident upon the fifth photodetector PD5. The electrical signal provided by the fifth photodetector PD5 is configured to be provided to the CCW resonance tracking servo 198 to be used to generate the CCW offset frequency signal 190 used to maintain the carrier frequency of the CCW slave laser 105 on a CCW resonance of the resonator 148.

Optical signals from the CCW slave laser 104 (coupled through optical waveguide 112') are collimated by a second collimating lens 134 and are directed towards second optical circulator 138. The second optical circulator 138 has a first output that directs a portion of the optical signals from the CCW slave laser 104 to a second mirror 142 and then to a fourth collimating lens 145 (and thus to a second port of the resonator 148), and a second output that couples a portion of the optical signals from the CW slave laser 104 and the master laser 102 circulating in the CW direction in the resonator 148 and emitted by the second mirror 142 of the resonator 148 to a fourth photodetector PD4.

The electrical output of the fourth photodetector PD4 is configured to provide an electrical signal proportional to the optical power incident upon the fourth photodetector PD4. The electrical signal provided by the fourth photodetector PD4 is configured to be provided to the CW resonance tracking servo 199 to be used to generate the CW offset frequency signal 192 used to maintain the carrier frequency of the CW slave laser 104 on a CW resonance of the resonator 148.

In the embodiment illustrated in FIG. 1, the resonator 148 comprises the optical fiber coil 150, the third collimating lens 147, the fourth collimating lens 145, the first mirror 140, and the second mirror 142. A portion of the CW optical signal, circulating in the CW direction of the resonator 148, in the resonator 148 is coupled out of the resonator 148 by the first mirror 140 and directed towards a sixth photodetector PD6. The electrical output of the sixth photodetector PD6 is configured to provide an electrical signal proportional to the optical power incident upon the sixth photodetector PD6. The electrical signal (PDH electrical signal) provided by the sixth photodetector PD6 at the reflection port is configured to be provided to the PDH servo 106 that controls the frequency of the master laser 102 to a frequency with a fixed offset from a center of a resonance dip detected using the sixth photodetector PD6.

Another portion of the CW optical signal, circulating in the CW direction of the resonator 148, is coupled out of the resonator 148 by the second mirror 142 and directed towards the second circulator 138. Such other portion of the CW optical signal emitted by the resonator 148 is transmitted by the second circulator 138 to the fourth photodetector PD4. Thus, the electrical signal generated by the fourth photodetector PD4 is proportional to the optical power of the CW optical signal incident upon the fourth photodetector PD4.

A portion of the CCW optical signal circulating in the CCW direction of the resonator 148 is coupled out of the resonator 140 by the first mirror 140 and directed towards the first circulator 136. Such portion CCW optical signal circulating in the CCW direction in the resonator 148 and emitted by the resonator 148 is transmitted by the first circulator 136 to the fifth photodetector PD5. Thus, the electrical signal generated by the fifth photodetector PD5 is proportional to the optical power of the CCW optical signal incident upon the fifth photodetector PD5. Further in this embodiment, a preponderance of optical energy, e.g., about ninety eight to ninety nine percent, of the CW optical signal and the CCW optical signal propagating through the first mirror 140 and the second mirror 142 recirculates through the resonator 148, and is not emitted by the resonator 148.

Optical signals, including the CW optical signal, emitted from the CW slave laser 104 and the master laser 102 are received by and emitted by the first collimating lens 135. Such optical signals are directed by the first collimating lens 135 to the first circulator 136. Then, such optical signals are directed from the first circulator 136 to the first mirror 140. A first portion of such optical signals, including the CW optical signal, are reflected by the first mirror 140 to the third collimating lens 147, and thus such optical signals, including the CW optical signal, are injected into the resonator 148; a second portion of such optical signals, including the CW optical signal, are transmitted by the first mirror 140 to be incident upon the sixth photodetector PD6. A third portion of the optical signals, including the CW optical signal, circulating in the resonator 148 is also reflected by the first mirror 140 to also be incident upon the sixth photodetector. The second portion interferes at the sixth photodetector PD6 with the third portion of the optical signal, including the CW optical signal, reflected from the circulating optical signals, including the CW optical signal. The differential phase arising from interference between the second portion and the third portion of the CW signal results in the PDH electrical signal (generated by the sixth photodetector PD6) whose amplitude varies based upon the amount of differential phase; the amplitude of the signal is utilized by the PDH servo 106 to adjust the carrier frequency of the master laser 102. This reduces relative phase noise between carrier frequency of the master slave laser 105 and the resonance frequencies of the resonator 148.

The CCW optical signal, emitted from the CCW slave laser 105 are received by and emitted by the second collimating lens 134. The CCW optical signal is directed by the second collimating lens 134 to the second circulator 138. Then, the CCW optical signal is directed from the second circulator 138 to the second mirror 142. A portion of the CCW optical signal is reflected by the second mirror 142 to the fourth collimating lens 145. Thus, the CCW optical signal is injected into the resonator 148.

To determine rate of rotation, $\Omega$, a center axis 196 of the optical fiber coil 150, a difference between the CW and CCW resonance frequencies of the fiber optic ring resonator 148 of the RFOG 100 is determined by the rate calculation circuitry 184 using the beat note frequency. To measure the resonance frequencies, the CW optical signal of the CW slave laser 104 and the CCW optical signal of the CCW slave laser 105 are used in an embodiment to probe resonance frequencies of the resonator 148 in respectively the CW and the CCW directions. The resulting CW and CCW optical signals are used to generate the beat note signal used to determine rate of rotation.

Resonance tracking modulation is applied to each of the CW optical signal and the CCW optical signal coupled to the resonator 148, and is used to detect the resonance frequencies in each of the CW and the CCW directions of the resonator 148. Optionally, the phase modulation is generated with a pair of phase modulators located between the output of the CW slave laser 104 and the first input 119a, and between the output of the CCW slave laser 105 and the second input 119b. For pedagogical purposes, phase modulation and phase modulator(s) are referenced herein; however, frequency modulation and frequency modulator(s) may be used in place of the phase modulation and phase modulator(s).

Optionally, Sideband Heterodyne Detection (SHD) modulation, at relatively high frequency (typically greater than 1 MHz) is also applied to both the CW optical signal and the CCW optical signal to reject signals due to optical backscatter. For example, the CCW offset frequency signal 192 and the CW offset frequency signal 190 are SHD frequency or phase modulated respectively in the CCW resonance tracking servo 198 and the CW resonance tracking servo 199; however, the SHD modulation may be performed (and the SHD modulator(s) and/or corresponding SHD modulator drive circuitry may be located) elsewhere, e.g., in IPC 110. The SHD modulation produces a signal at the resonator output (e.g., at the output of the first circulator 136 coupled to the fifth photodetector PD5 in the illustrated embodiment) at twice the frequency of the SHD modulation frequency when the laser carrier frequency are at some fixed offset from resonance, and the laser first-order sidebands generated by the SHD modulation are on resonance, or when the carrier frequency of a corresponding slave laser and the second-order sidebands generated by the SHD modulation are on resonance. The SHD modulation sidebands are about the carrier frequency of a corresponding slave laser.

When SHD modulation is employed, the resonance tracking modulation results in an amplitude modulation (AM), on the CW optical signal emitted by the resonator 148 and incident upon the fourth photodetector PD4 and on the CCW optical signal emitted by the resonator 148 and incident upon the fifth photodetector PD5, that is at twice the respective SHD frequency. When the laser first-order sidebands generated by the SHD modulation are on resonance, or when the CW laser carrier frequency and the CW laser second-order sidebands generated by the SHD modulation are on resonance, the amplitude modulation of the CW and CCW resonator output signals has no content at the resonance tracking modulation frequency.

Differential harmonics of the resonance tracking modulation may be generated by imperfections, such as nonlinearity, in the phase (or frequency) modulator drive circuitry, the phase (or frequency) modulator(s), and/or possibly other components (e.g., other circuitry). Such modulators, driver circuitry, and/or other components are used to provide resonant tracking modulation. Optionally, the resonant tracking modulation is applied at a fundamental frequency of 7 kHz; thus, second and higher order harmonics may thus occur at 14 kHz, 21 kHz, 28 kHz, etc. Difference between the CW and CCW components can result in differential harmonics, which can create an error in determined rotation rate of the RFOG.

Since the CW and CCW optical signals are locked onto adjacent resonances, the carrier frequencies of the CW and CCW optical signals will be separated by one free spectral range (FSR) of the gyro resonator. Therefore, the beat note signal from the third photodetector PD3 will have a carrier at a frequency equal to a FSR plus the frequency shift due to rotation of the optical fiber coil 150 about its center axis 196. Differential harmonics on the resonance tracking modulations will produce sidebands about the beat note signal carrier frequency. The difference between the carrier frequency and sidebands of the beat note signal will be equal to the frequency of the differential harmonic. The beat note servo 180 demodulates the beat note signal at the beat note carrier frequency. Therefore, the sidebands due to differential harmonics are frequency down converted to baseband, and show up at their respective frequencies on the beat note servo 180 output to the differential harmonic correction circuitry 182. The demodulated (or baseband) sidebands are an alternating current error signals for control loops that diminish, e.g., eliminate, the differential harmonics of the resonance tracking modulation. Each AC error signal corresponds to a unique differential harmonic. To diminish, e.g., eliminate, differential harmonics, the differential harmonic correction circuitry 182 is configured to receive at least one differential harmonic AC error signal (differential harmonic AC error signal(s)) 181 from the beat note servo 180. Using the received differential harmonic AC error signal(s) 181, the differential harmonic correction circuitry 182 generates a differential harmonic correction signal for each of one or more of the at least one differential harmonic desired to be corrected. The implementation of the differential harmonic correction circuitry 182 determines which of the at least one differential harmonic the error cancellation signal(s) 185 (generated by the differential harmonic correction circuitry 182) is intended to correct. Prior to discussing the differential harmonic correction circuitry 182 further, the beat note servo 180 will now be described.

Figure 2:
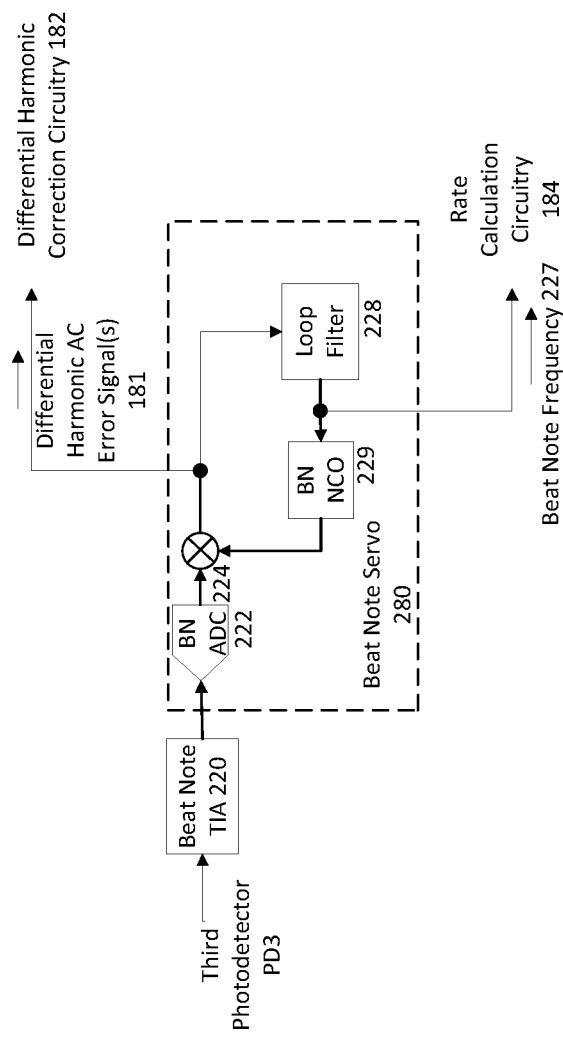
FIG. 2 illustrates a block diagram of one embodiment a beat note servo.

FIG. 2 illustrates a block diagram of one embodiment a beat note servo 280. However, other implementations of a beat note servo may be used as an alternative to the design of FIG. 2.

Returning to FIG. 2, an input to the beat note servo 280 is configured to receive a signal from the third photodetector PD3. Because the output of the third photodetector PD3 may be a current signal, optionally, an optional beat note transimpedance amplifier (TIA) 220 may be inserted between the third photodetector PD3; the beat note TIA 220 is configured to convert a current signal generated by the third photodetector PD3 to a voltage signal which is provided to the input of, and can be processed by, the beat note servo 280.

The third photodetector PD3 is configured to provide an electrical signal (or a beat note signal) proportional to the optical power incident upon the third photodetector PD3 of a beat note created by the interference of the CW optical signal and the CCW optical signal at the third photodetector PD3. The beat note servo 280 is configured to detect, or measure, the frequency of the beat note signal. The frequency of the beat note signal is the difference between the optical carrier frequencies of the clockwise optical signal and the counter clockwise optical signal. The beat note servo is optionally designed to measure and provide at one of its outputs a beat note frequency 227 in the presence of other frequency components. The beat note frequency 227 is the frequency of the beat note arising from the CW and CCW optical signals incident at the third photodetector PD3. In the illustrated embodiment, the beat note servo 280 comprises a digital phase locked loop which performs such detection function.

The digital phase locked loop, and thus the beat note (BN) servo 280, is implemented with digital signal processing. Optionally, the beat note servo 280 comprises an BN analog to digital converter (ADC) (or BN ADC circuitry) 222, a BN digital mixer (or BN digital mixer circuitry) 224, a digital loop filter (or digital loop filter circuitry) 228, and a BN numerically controlled oscillator (NCO) 229. Optionally, the digital loop filter 228 comprises digital gain circuitry and/or a digital filter (e.g., an integrator circuitry with a zero (integrator with zero) 228 or a low pass filter with a cut-off frequency). The digital gain circuitry is configured to increase or diminish the digital loop filter 228, and hence the amplitude of the signal provided at the output of the BN digital mixer 224. The digital filter may be implemented with an infinite or finite impulse filter. The BN digital mixer 224 may be implemented with a digital multiplier.

The signal output from the third photodetector PD3, and output from the beat note TIA 220, is an analog signal. The BN ADC 222 digitizes the analog signal (whether a current signal or a voltage signal). The beat note servo 280 locks an output frequency of the BN NCO 229 to the digitized analog signal, but with a 90-degree phase shift from the digitized analog signal so that the average output of the BN digital mixer 224 is at or near zero. When the digital loop filter 228 is an integrator with a zero, the average output of the BN digital mixer 224 thus is at or near zero. A first input of the BN digital mixer 224 is configured to receive the digitized analog signal. A second input of the BN digital mixer 224 is configured to be coupled to an output of the BN NCO 229, and to receive an output signal from the BN NCO 229. The output of the digital mixer is configured to be coupled to an input of the digital loop filter 228. An output of the digital loop filter 228 is configured to be coupled to an input of the BN NCO 229.

The output of the BN digital mixer 224 is configured to generate an output signal comprising the at least one differential harmonic AC error signal. If the beat note servo 280 closed loop bandwidth is less than the frequency of each baseband differential harmonic desired to be extracted from the beat note servo 280, then the output of the BN digital mixer 224 is configured to be coupled to an input of the differential harmonic correction circuitry 182. However, if the beat note servo 280 closed loop bandwidth is not less than the frequency of each differential harmonic AC error signal desired to be extracted from the beat note servo 280, then the output of the digital loop filter 228 is configured to be coupled to the input of the differential harmonic correction circuitry 182. In one embodiment, a bandwidth and gain of the digital loop filter 228 may be such that the beat note servo 280 closed loop bandwidth is between one and two kilohertz; however, the bandwidth may be outside of this range. An alternative to selecting an output of the beat note servo 280 at the input or output of the loop filter 228 depending upon the bandwidth of the loop filter 228 (which is used when utilizing a difference of the frequencies output by the BN NCO 229 and the BN ADC 222), the output of the beat note servo 280 may be taken at the input of the loop filter 280 (regardless of the bandwidth of the loop filter 228) when using a sum of the frequencies output by the BN NCO 229 and the BN ADC 222 and coupled to the DHCC 180. If the sum of frequencies is used, then the loop filter 330 is a band or high pass filter having a filter characteristic that attenuates the difference frequency component and passes the sum frequency component. (When the difference frequency component is used, then a low or band pass filter is used as the loop filter 228 to filter out the sum frequency and optionally a DC component.) In the event that the sum frequency component is used, then, the subsequently described sine-cosine signal generator 332x are configured to generate output signals having a frequency that has been increased by twice the beat note frequency generated by the output of the loop filter 330.

The digital loop filter 228 and the output frequency of the BN NCO 229 are designed so that the difference between initial output frequency of the BN NCO 229 and the frequency of the electrical beat signal falls within half the frequency of the nearest undesired frequency components, e.g., modulation sidebands generated by the SHD modulation which could be 100 Hz away from the frequency of the electrical beat signal. As a result, the digital phase lock loop locks the BN NCO 229 onto the beat note carrier frequency and 90-degree phase of the digitized electrical beat note signal, and not onto a frequency of the other frequency components.

The digital loop filter 228 is configured to generate, at the output of the digital loop filter 228, a frequency of the beat note signal. The rate calculation circuitry 184 is configured to receive the frequency of the beat note signal from the beat note servo 180, e.g., from the output of the digital loop filter 228. The output of the digital loop filter 228 is configured to be coupled to an input of the BN NCO 229, and to provide frequency control words to the BN NCO 229.

Figure 3:
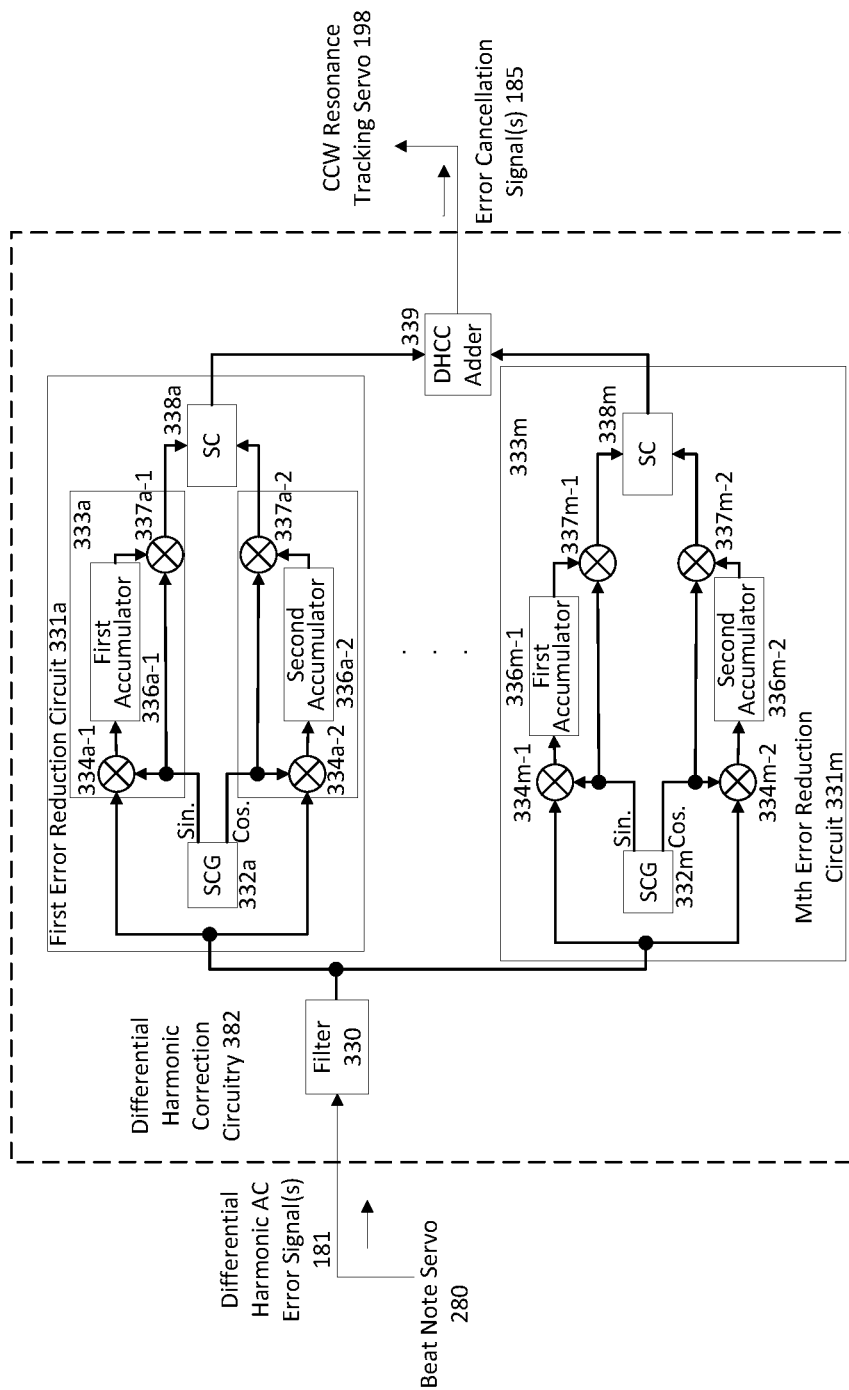
FIG. 3 illustrates a block diagram of one embodiment of differential harmonic correction circuitry.

FIG. 3 illustrates a block diagram of one embodiment of differential harmonic correction circuitry 382. The differential harmonic correction circuitry 382 can be implement in other ways, e.g., using in phase or quadrature phase circuitry alone and then shifting a phase of a signal from a signal generator to generate cancellation component; thus, also, no signal combiner would be required.

The differential harmonic correction circuitry 382 may be implemented in different ways, including using an analog implementation using a direct digital synthesizer for the sine cosine generator, and analog mixers in lieu of digital mixers, e.g., digital multipliers. The differential harmonic correction circuitry 382 comprises at least one error reduction circuit 331x. Each error reduction circuit is configured to generate an error cancellation signal at a frequency of a corresponding differential harmonic, and to be coupled to one resonance tracking servo (e.g. the CCW resonance tracking servo 198). The error cancellation signal diminishes, e.g., cancels, a corresponding differential harmonic signal so as to reduce RFOG bias. If more than one error reduction circuit is utilized so that more than one error correction signal is generated for more than one differential harmonic, then, optionally, the outputs of each error reduction circuit (and thus the error correction signals) may be combined, e.g., with an optional differential harmonic correction circuitry (DHCC) adder (or DHCC adder circuitry) 339.

Optionally, the differential harmonic correction circuitry 382 also includes a filter 330, e.g. a band pass or low pass filter. The filter 330 is coupled between the input of the differential harmonic correction circuitry 382 and each error reduction circuit 331x. The filter 330 is used to diminish or suppress signals out of band of the differential harmonic AC error signal(s) 181.

Each error reduction circuit 331x is configured to have an input coupled to an output of the beat note servo 180 (e.g., the output of the BN digital mixer 224 or the output of the loop filter 228) configured to provide the output signal comprising at least one differential harmonic AC error signal. Thus, each error reduction circuit 331x (of the differential harmonic correction circuitry 382) is used to generate a unique error cancellation signal used to cancel a unique differential harmonic.

Optionally, the differential harmonic correction circuitry 382 further comprises a filter 330 (e.g., a passband filter configured to only pass the at least one differential harmonics demodulated to baseband) that is coupled between the input of each error reduction circuit and the output of the beat note servo 180 (e.g., the output of the BN digital mixer 224) configured to provide the output signal comprising the at least one differential harmonics demodulated to baseband.

Each error reduction circuit 331x comprises a sine-cosine signal generator (SCG or sine/cosine signal generator circuitry) 332x, a first digital mixer (or first digital mixer circuitry) 334x-1, a second digital mixer (or second digital mixer circuitry) 334x-2, a first digital multiplier (first digital multiplier circuitry) 337x-1, a second digital multiplier (second digital multiplier circuitry) 337x-2, a first accumulator (or first accumulator circuitry) 336x-1, a second accumulator (or second accumulator circuitry) 336x-2, and a signal combiner (SC) (or SC circuitry) 338a. The digital mixers may be implemented as digital multipliers (or digital multiplier circuits). The sine/cosine signal generator 332x may be implemented with an NCO (or NCO circuit).

The SCG 332x generates sine and cosine signals having a frequency near or equal to the carrier frequency of the differential harmonic to be reduced so that the corresponding error reduction circuit 331x acts as a notch filter with a finite bandwidth and diminishes any signal in the finite bandwidth. 'Near' means that the carrier frequency of the differential harmonic has to fall within a bandwidth—having sufficient gain to suppress differential harmonics—of a loop of the RFOG formed by the BN servo 180, the differential harmonic correction circuitry 182, a corresponding RT servo, a corresponding OPLL, and a corresponding slave laser. Typically, the frequency of the SCG 332x has to be within 1 Hz of the carrier frequency of the differential harmonic sought to be diminished by the corresponding error reduction circuit 331x.

The sine/cosine signal generator generates a sine wave signal and a cosine wave signal (which are ninety degrees out of phase). Each sine and cosine signal generated by a SCG 332x is used as local oscillator signals for respectively corresponding first digital mixer 334x-1 and second digital mixer 334x-2, and as carrier signals for respectively corresponding first digital multiplier 337x-1 and second digital multiplier 337x-2.

A sine signal (Sin.) generated by the SCG 332x is coupled to a first input of the first digital mixer 334x-1 and a first input of a first digital multiplier 337x-1. The cosine signal (Cos.) generated by the SCG 332x is coupled to a first input of the second digital mixer 334x-2 and a first input of the second digital multiplier 337x-2.

AC error components are configured to be coupled to a second input of each of the first digital mixer 334x-1 and the second digital mixer 334x-1. Each of the first digital mixer 334x-1 and the second digital mixer 334x-2 translates to baseband in phase and quadrature phase components of the differential harmonic AC error signal corresponding to the frequency of the sine and cosine signal. Such baseband signals may be respectively referred to as an in phase differential harmonic direct current (DC) error signal and a quadrature phase differential harmonic DC error signal. The in phase differential harmonic DC error signal and the quadrature phase differential harmonic DC error signal are used to control the amplitude of respectively an in phase error cancellation signal and a quadrature phase error cancellation signal.

Each of the corresponding first accumulator 336x-1 and the second accumulator 336x-2 integrates the baseband in phase and quadrature phase components. Each accumulator may be referred to as accumulator circuitry. Such integration adjusts amplitude of the corresponding in phase error cancellation signal and quadrature phased cancellation signal.

A first input of each of the first digital multiplier 337x-1 and the second digital multiplier 337x-2 respectively the integrated baseband in phase component and the integrated baseband quadrature phase component. Each digital multiplier may be referred to as digital multiplier circuitry. A second input of each of the first digital multiplier 337x-1 and the second digital multiplier 337x-2 respectively receives the sine signal and the cosine signal. The first digital multiplier 337x-1 multiplies the integrated baseband in phase component and the sine signal. The second digital multiplier 337x-2 multiplies the quadrature phase component and the cosine signal. Such multiplication by the first digital multiplier 337x-1 respectively generates the in phase error cancellation signal for the corresponding differential harmonic at the output of the first digital multiplier 337x-1. Such multiplication by the second digital multiplier 337x-2 respectively generates the quadrature phase error cancellation signal for the corresponding differential harmonic at the output of the second digital multiplier 337x-2.

Inputs of a corresponding signal combiner 338x are respectively coupled to the outputs of the first digital multiplier 337x-1 and the second digital multiplier 337x-2. The signal combiner may be referred to as signal combiner circuitry. The signal combiner 338x combines the in phase error cancellation signal and the quadrature phase error cancellation signal for the corresponding differential harmonic, and provides (at an output of the SC 338x) a resulting error cancellation signal for the differential harmonic (formed by the in phase and quadrature components) at an output of the signal combiner 338x and at the frequency of the sine and cosine signals generated by the corresponding SCG 332x. Each error cancellation signal at an output of the SC 338x is an AC signal at baseband. Optionally, if more than one error reduction circuit 331x is used, the output of each error reduction circuit (and each error cancellation signal) may be combined by another signal combiner (e.g., the DHCC adder 339). Such signal combiner or adder may be respectively referred to as signal combiner circuitry or adder circuitry.

Figure 4:
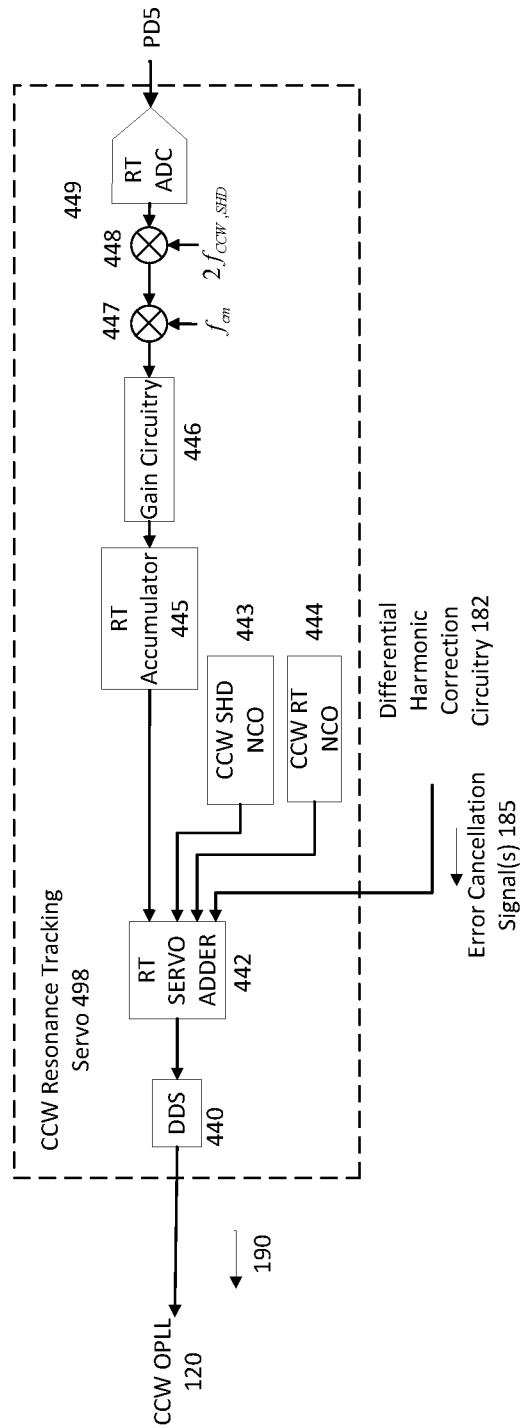
FIG. 4 illustrates a block diagram of one embodiment of a counter clockwise resonance tracking servo.

FIG. 4 illustrates a block diagram of one embodiment of a CCW resonance tracking servo 498. In an alternate embodiment, the error cancellation signal(s) 185 may be added in the CW resonance tracking servo 199. The illustrated CCW resonance tracking servo 498 comprises a direct digital synthesizer (DDS) 440, a RT servo digital adder (RT servo adder) 442, a CCW resonance tracking (RT) NCO 444, a RT accumulator 445, gain circuitry 446, a first digital demodulator 447, and an RT ADC 449. Optionally, the CCW resonance tracking servo 498 includes a CCW SHD NCO 443 and a second digital demodulator 448.

The CCW resonance tracking servo 498, e.g., the RT ADC 449, is configured to receive the electrical signal generated by the fifth photodetector PD5. The RT ADC 449 digitizes the electrical signal and provides digitized electrical signal to a first input of the first digital demodulator 447 or optionally to a first input of the second digital modulator 448 (if SHD modulation is used).

Optionally, if SHD modulation is used, a second input of the second digital demodulator 448 is configured to receive a signal having a frequency of twice the CCW SHD modulation frequency ($F_{CCW, SHD}$). The second digital demodulator 448 generates a signal at the output of the second digital demodulator 448 that is the digitized electrical signal demodulated at twice the CCW SHD modulation frequency.

The output of the optional second digital demodulator 448 (or alternatively the output of the RT ADC) is coupled to a first input of the first digital demodulator 447 which is configured to optionally receive the digitized electrical signal demodulated at twice the CCW SHD modulation frequency (or alternatively a digitized electrical signal generated by the fifth photodetector PD5). The first digital demodulator 447 is also configured to receive a signal having a common modulation frequency ($f_{cm}$) at a second input of the first digital demodulator 447. The first digital demodulator 447 demodulates—the digitized electrical signal demodulated at twice the CCW SHD modulation frequency or the digitized electrical signal generated by the fifth photodetector PD5—at the common modulation frequency. The average output of the first digital demodulator 447 is an error signal coupled to the CCW OPLL 120 to facilitate a resonance tracking control loop to maintain the CCW slave laser 105 on a CCW resonance of the resonator 148. The output of the first digital demodulator 447 is coupled to an input of the gain circuitry 446. The gain circuitry 446 applies a gain (or an attenuation) to the resonance tracking error signal from demodulator 447 to ensure the resonance tracking loop is stable and that the RFOG 100 has a desired bandwidth. An output of the gain circuitry 446 is coupled to an input of the RT accumulator 445. The RT accumulator 445 integrates any non-zero input so as to drive its average input to zero by outputting a control signal to keep the CCW slave laser on resonance. The output of RT accumulator 445 is an offset frequency signal (e.g., CCW offset frequency signal) summed at the RT servo adder 442 with an output from the CCW RT NCO 444, and optionally an output from the optional CCW SHD NCO 443. The optional CCW SHD NCO 443 outputs a sinusoidal digital signal at the CCW SHD frequency. The CCW RT NCO 44 outputs a sinusoidal digital signal at the resonance tracking modulation frequency. The output of the RT servo adder 442 is coupled to an input of the DDS 440. The DDS 440 converts digital data at its input to an analog signal which provides an offset frequency for the CCW OPLL 120. Optionally, the CCW SHD modulation signal frequency or phase modulates the DDS 440 output frequency at the SHD modulation frequency. The CCW resonance tracking modulation frequency or phase modulates the DDS 440 output frequency at the resonance tracking modulation frequency. Thus, the DDS 440 provides an analog signal at its output with a carrier frequency equal to an offset frequency that centers the OPLL on a resonance peak, along with a signal modulated by the resonance tracking modulation frequency, and also optionally by the SHD modulation frequency. The resonance tracking modulation frequency, and if used, the optional SHD modulation frequency, frequency or phase modulate the CW and CCW offset frequencies generated by a DDS in respectively each of the CW resonance tracking servo and the CCW resonance tracking servo.

Note, typically, if one of the resonance tracking servos, e.g., the CCW resonance tracking servo, is implemented as described above with respect to FIG. 4, then the other resonance tracking servo, e.g., the CW resonance tracking servo, would be similarly implemented except that it would not receive at least one error cancellation signal 185. However, resonance tracking modulation by phase or frequency modulation can be applied in alternative ways.

Figure 5:
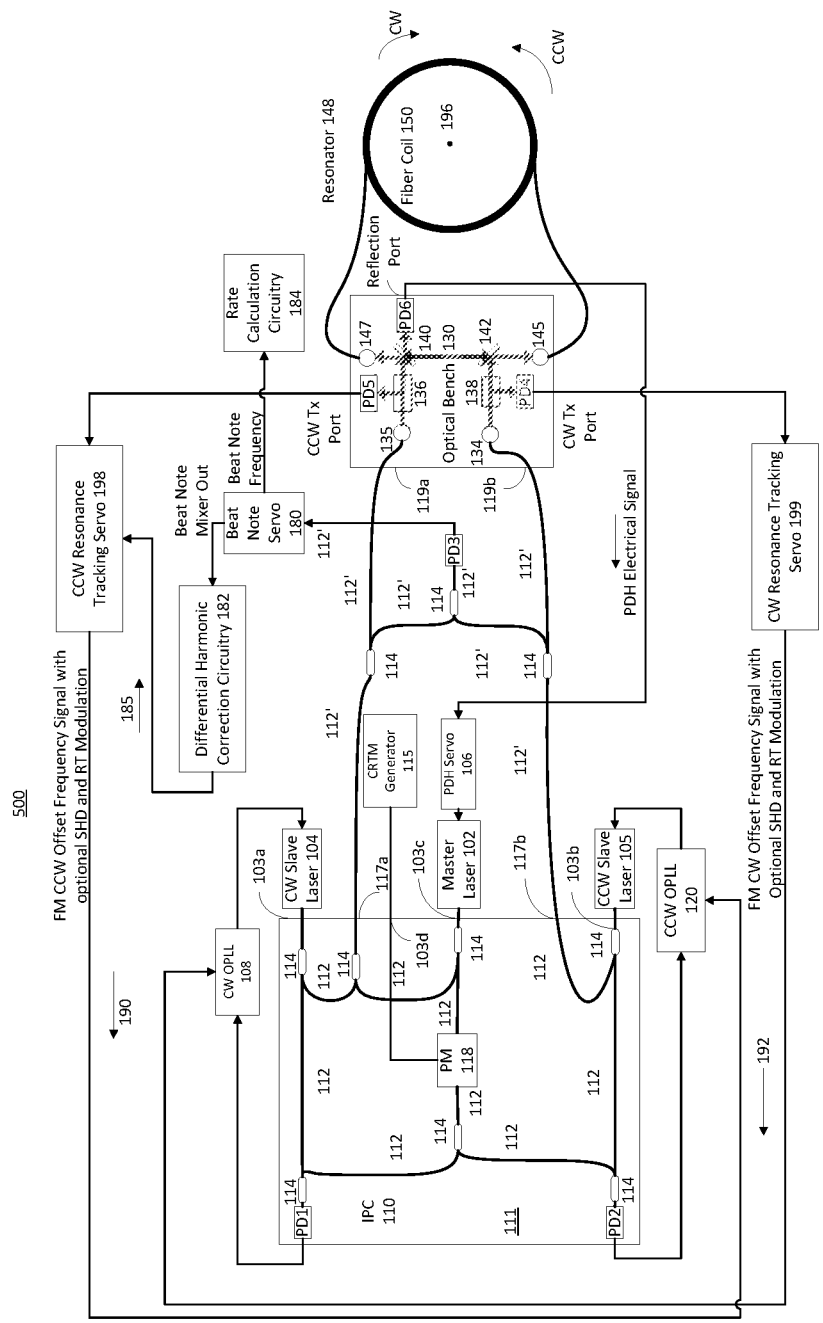
FIG. 5 illustrates a block diagram of one embodiment a resonator fiber optic gyroscope employing common resonance tracking modulation applied to a portion of an optical signal generated by a master laser.

The resonator fiber optic gyro (RFOG) 100 of FIG. 1 may employ resonance tracking modulation with frequency or phase modulating the CW and CCW offset frequencies using RT NCOs. Alternatively, the differential modulation correction circuitry can be employed to correct differential modulation harmonics when other methods of common resonance tracking modulation are employed. FIG. 5 illustrates a block diagram of one embodiment of an RFOG 500 employing a common resonance tracking modulation applied to a portion of an optical signal generated by the master laser 102 and which is coupled to the CW OPLL 108 and the CCW OPLL 120. A common resonance tracking modulation (CRTM) generator 115 generates, at an output of the CRTM generator 115, an analog resonance tracking modulation signal. The CRTM generator 115 is used in lieu of the CW and CCW RT NCOs in the CW and CCW resonance tracking servo described with respect to FIG. 1. The output of the CRTM generator 115, and thus the analog modulation signal, is coupled to an optical phase modulator (PM) 118 on the IPC 110 through a fourth input 103d of the IPC 110. Optionally, the integrated photonics circuitry 110 integrates the optical phase modulator 118 on the substrate 111. The optical phase modulator 118 may be formed from a semiconductor, e.g. silicon, if the rest of the IPC 110 is formed from semiconductor. Since the portion of the optical signal generated by the master laser 102 used by the CW OPLL 108 and the CCW OPLL 120 is phase modulated at the resonance tracking modulation frequency, the CW OPLL 108 and CCW OPLL 120 transfer the resonance tracking modulation to the CW slave laser 104 and the CCW slave laser 105 with a high degree of commonality. However, imperfections in the optics devices can lead to differential harmonic modulation. For example, to optical phase modulator 118 can also generate intensity modulation at a harmonic of the resonance tracking modulation. Differential harmonic modulation in the CW optical signal and the CCW optical signal (respectively generated by the CW slave laser 104 and the CCW slave laser 105) can arise respectively from the CW OPLL 108 and the CCW OPLLs because each has a different response to the intensity modulation. If the implementation of FIG. 5 is employed, then RT NCOs (444) would not be utilized in the corresponding resonance tracking servos as illustrated in FIG. 4.

Figure 6:
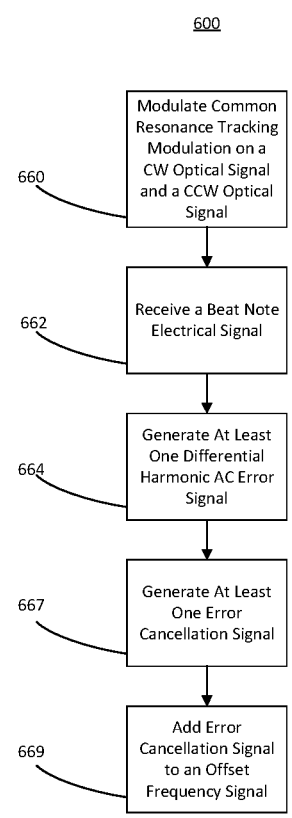
FIG. 6 illustrates a flow diagram of an exemplary method of reducing differential harmonics of resonance tracking modulation in a resonant fiber optic gyroscope.

FIG. 6 illustrates a flow diagram of an exemplary method 600 of reducing differential harmonics of resonance tracking modulation in a resonant fiber optic gyroscope. To the extent the method 600 shown in FIG. 6 is described herein as being implemented in the systems shown in FIGS. 1-5, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 660, modulate common resonance tracking modulation on a CW optical signal, e.g., emitted from a CW slave laser, and on a second optical signal, e.g., emitted from a second slave laser. In block 662, receive a beat note electrical signal of a CW optical signal and a CCW optical signal, e.g., emitted respectively by lasers for example the CW slave laser 104 and the CCW slave laser 105. In block 664, using the beat note signal, generate at least one AC error signal, where each AC error signal corresponds to a unique differential harmonic. In block 667, use the at least one AC error signal, generate at least one error cancellation signal, where each error cancellation signal corresponds to an AC error signal and a differential harmonic desired to be suppressed. In block 669, adding the at least one error cancellation signal to an offset frequency signal to diminish, e.g., cancel, the differential harmonics in the RFOG.

EXAMPLE EMBODIMENTS

Example 1 includes A system for diminishing differential harmonics of common resonance tracking modulation in a resonant fiber optic gyroscope (RFOG), comprising: beat note servo circuitry configured to receive an electrical beat note signal and to generate at least one differential harmonic alternating current (AC) signal, where the at least one differential harmonic AC signal is generated using the beat note signal, where the electrical beat note signal is created from a beat note of a first optical signal generated by a first optical laser and a second optical signal generated by a second laser, where the first optical signal and the second optical signal are modulated with the common resonance tracking modulation, where the first optical signal circulates in a first direction in a resonator of the RFOG, and where the second optical signal circulates in a second direction in the resonator of the RFOG that is opposite the first direction; differential harmonic correction circuitry configured to generate at least one error cancellation signal using, where each error cancellation signal is generated using a corresponding differential harmonic AC signal, and where each error cancellation signal and its corresponding differential harmonic AC signal correspond to a differential harmonic desired to be diminished; and adder circuitry configured to add the at least one error cancellation signal to an offset frequency signal to the differential harmonics, where the offset frequency signal comprises a frequency used to tune a carrier frequency of one of the first optical signal and the second optical signal to a resonant frequency in respectively one of the first direction and the second direction; wherein each differential harmonic of the common resonance tracking modulation is a vectoral difference between a harmonic of common resonance tracking modulation of the first optical signal and a same harmonic of common resonance tracking modulation of the second optical signal, and where a harmonic may be a fundamental frequency.

Example 2 includes the system of Example 1, wherein the beat note servo is further configured to generate a beat note frequency.

Example 3 includes the system of and of Examples 1-2, wherein the beat note servo comprises: a beat note (BN) analog to digital converter (ADC) circuitry comprising an input and an output, where the output of the BN ADC circuitry is configured to receive and digitize an electrical beat note signal; a BN digital mixer circuitry comprising a first input, a second input, and an output, where the first input of the BN digital mixer is configured to receive a digitized electrical beat note signal from the BN ADC circuitry, and where the output of the BN digital mixer circuitry is configured to generate the at least one differential AC error signal; digital loop filter circuitry comprising an input and an output, where the input of the digital loop filter circuitry is coupled to the output of the BN digital mixer circuitry; and a BN numerically controlled oscillator (NCO) comprising an input and an output, where the input of the BN NCO is coupled to the output of the digital loop filter circuitry, and where the output of the BN NCO is coupled to the second input of the BN digital mixer circuitry.

Example 4 includes the system of Example 3, wherein the output of the digital loop filter circuitry is configured to be generate a beat note frequency.

Example 5 includes the system of any of Examples 1-4, further comprising a transimpedance amplifier coupled an input of the BN servo circuitry and configure to convert the beat note electrical signal from a current signal to a voltage signal.

Example 6 includes the system of any of Examples 1-5, wherein the differential harmonic correction circuitry comprises at least one error reduction circuit configured to generate an error cancellation signal using a differential harmonic AC signal for a differential harmonic desired to be cancelled; and wherein each error reduction circuit comprises: sine-cosine signal generator (SCG) circuitry comprising a first output configured to provide a sine signal and second output configured to provide a cosine signal at a same frequency; first digital mixer circuitry comprising a first input, a second input, and an output, where the first input of the first digital mixer is configured to receive at least one differential harmonic AC error signal, and where the second input of the first digital mixer is coupled to the first output of the SCG circuitry; second digital mixer circuitry comprising a first input, a second input, and an output, where the first input of the second digital mixer is configured to receive at least one differential harmonic AC error signal, and where the second input of the second digital mixer is coupled to the first output of the SCG circuitry; first accumulator circuitry comprising an input and an output, where the output of the first digital mixer circuitry is coupled to the input of the first accumulator; second accumulator circuitry comprising an input and an output, where the output of the second digital mixer circuitry is coupled to the input of the second accumulator; first digital multiplier circuitry comprising a first input, a second input, and an output, where the first input of the first digital multiplier circuitry is coupled to the output of the first accumulator circuitry, and where the second input of the first digital multiplier circuitry is coupled the first output of the SCG circuitry; second digital multiplier circuit comprising a first input, a second input, and an output, where the first input of the second digital multiplier circuitry is coupled to the output of the second accumulator circuitry, and where the second input of the second digital multiplier circuitry is coupled the second output of the SCG circuitry; and signal combiner circuitry comprising a first input, a second input, and an output, where the first input is coupled to the output of the first digital multiplier circuitry, and where the second input is coupled to the output of the second digital multiplier circuitry.

Example 7 includes the system of Example 6, wherein the differential harmonic correction circuitry further comprises adder circuitry configured to combine the output of each error reduction circuit.

Example 8 includes a method for diminishing differential harmonics of common resonance tracking modulation in a resonant fiber optic gyroscope (RFOG), comprising: modulate the common resonance tracking modulation on a first optical signal and a second optical signal; receive a beat note electrical signal, where the beat note electrical signal is created from a beat note of a first optical signal generated by a first optical laser and a second optical signal generated by a second laser; generate at least one differential harmonic alternating current (AC) error signal; generate at least one error cancellation signal using, where each error cancellation signal is generated using a corresponding differential harmonic AC signal, and where each error cancellation signal and its corresponding differential harmonic AC signal correspond to a differential harmonic desired to be diminished; and add the at least one error cancellation signal to an offset frequency signal to the differential harmonics, where the offset frequency signal comprises a frequency used to tune a carrier frequency of one of the first optical signal and the second optical signal to a resonant frequency in respectively one of the first direction and the second direction; wherein each differential harmonic of the common resonance tracking modulation is a vectoral difference between a harmonic of common resonance tracking modulation of the first optical signal and a same harmonic of common resonance tracking modulation of the second optical signal, and where a harmonic may be a fundamental frequency.

Example 9 includes the method of Example 8, further comprising digitizing the beat note electrical signal, where the at least one differential AC error signal is generated with the digitized beat note electrical signal.

Example 10 includes the method of any of Examples 8-9, further comprising converting the beat note electrical signal from a current signal to a voltage signal.

Example 11 includes a resonant fiber optic gyroscope (RFOG) configured to diminish differential harmonics of common resonance tracking modulation, comprising: an optical fiber coil comprising a first port and a second port; optical bench circuitry comprising a first input, a second input, a first port, a second port, a first output, a second output, and a third output, and where the first port and the second port of the optical bench are configured to be coupled respectively to the first port and the second port of the optical fiber coil, and further configured to generate a first electrical signal, a second electrical signal, and an PDH electrical signal, where the PDH electrical signal has an amplitude that varies based upon a differential phase of a first optical signal being injected into the optical fiber coil and a first optical signal circulating in the optical fiber coil; Pound-Drever-Hall (PDH) servo circuitry comprising an input and an output, where the input is configured to receive the PDH electrical signal; a master laser comprising an input configured to be coupled to the output of the PDH servo circuitry, and configured to generate a master optical signal; a first slave laser configured to generate the first optical signal modulated by a common resonance tracking modulation which circulates in the optical fiber coil in a first direction; a second slave laser configured to generate the second optical signal modulated by the common resonance tracking modulation which circulates in the optical fiber coil in a second direction, where the first direction is opposite the second direction; first optical phase lock loop (OPLL) circuitry configured to receive the first optical signal and the master optical signal; second OPLL circuitry configured to receive the second optical signal and the master optical signal and to provide a second OPLL signal to the second slave laser; an integrated photonics circuitry coupled to the first slave laser and configured to receive the first optical signal, coupled to the second slave laser and configured to receive the second optical signal, coupled to the master laser and configured to receive the master optical signal, coupled to the first OPLL circuitry and configured to provide the first optical signal and the master optical signal to the first OPLL circuitry, coupled to the second OPLL circuitry and configured to provide the second optical signal and the master optical signal to the second OPLL circuitry, configured to provide the first optical signal and the master optical signal to the first input of the optical bench circuitry, and configured to provide the second optical signal to the second input of the optical bench circuitry; beat note servo circuitry configured to receive an electrical beat note signal and to generate at least one differential harmonic alternating current (AC) signal and to generate a beat note frequency, where the at least one differential harmonic AC signal is generated using the beat note signal, where the electrical beat note signal is created from a beat note of the first optical signal generated by the first optical laser and the second optical signal generated by the second laser, where the first optical signal circulates in a first direction in a resonator of the RFOG, and where the second optical signal circulates in a second direction in the resonator of the RFOG that is opposite the first direction, where the resonator is formed by the optical fiber coil and a portion of the optical bench circuitry; rate calculation circuitry coupled to the beat note servo circuitry and configured to receive the beat note frequency and to determine a rate of rotation of the fiber coil around a center axis; differential harmonic correction circuitry configured to generate at least one error cancellation signal using, where each error cancellation signal is generated using a corresponding differential harmonic AC signal, and where each error cancellation signal and its corresponding differential harmonic AC signal correspond to a differential harmonic desired to be diminished; first resonance tracking servo circuitry configured to receive the first electrical signal generated by the optical bench circuitry used to generate a first offset frequency signal comprising a frequency used to tune a carrier frequency of the first optical signal generated by the first slave laser to a resonant frequency in the first direction; and second resonance tracking servo circuitry configured to receive the second electrical signal generated by the optical bench circuitry used to generate a second offset frequency signal comprising a frequency used to tune a carrier frequency of the second optical signal generated by the second slave laser to a resonant frequency in the second direction, and to receive the at least one error cancellation signal; wherein each differential harmonic of the common resonance tracking modulation is a vectoral difference between a harmonic of common resonance tracking modulation of the first optical signal and a same harmonic of common resonance tracking modulation of the second optical signal, and where a harmonic may be a fundamental frequency.

Example 12 includes the RFOG of Example 11, wherein the beat note servo comprises: a beat note (BN) analog to digital converter (ADC) circuitry comprising an input and an output, where the output of the BN ADC circuitry is configured to receive and digitize an electrical beat note signal; a BN digital mixer circuitry comprising a first input, a second input, and an output, where the first input of the BN digital mixer is configured to receive a digitized electrical beat note signal from the BN ADC circuitry, and where the output of the BN digital mixer circuitry is configured to generate the at least one differential AC error signal; digital loop filter circuitry comprising an input and an output, where the input of the digital loop filter circuitry is coupled to the output of the BN digital mixer circuitry, where the output of the digital loop filter circuitry is configured to be generate a beat note frequency; and a BN numerically controlled oscillator (NCO) comprising an input and an output, where the input of the BN NCO is coupled to the output of the digital loop filter circuitry, and where the output of the BN NCO is coupled to the second input of the BN digital mixer circuitry.

Example 13 includes the RFOG of any of Examples 11-12, further comprising a transimpedance amplifier coupled an input of the BN servo circuitry and configure to convert the beat note electrical signal from a current signal to a voltage signal.

Example 14 includes the RFOG of any of Examples 11-13, wherein the differential harmonic correction circuitry comprises at least one error reduction circuit configured to generate an error cancellation signal using a differential harmonic AC signal for a differential harmonic desired to be cancelled; and wherein each error reduction circuit comprises: sine-cosine signal generator (SCG) circuitry comprising a first output configured to provide a sine signal and second output configured to provide a cosine signal at a same frequency; first digital mixer circuitry comprising a first input, a second input, and an output, where the first input of the first digital mixer is configured to receive at least one differential harmonic AC error signal, and where the second input of the first digital mixer is coupled to the first output of the SCG circuitry; second digital mixer circuitry comprising a first input, a second input, and an output, where the first input of the second digital mixer is configured to receive at least one differential harmonic AC error signal, and where the second input of the second digital mixer is coupled to the first output of the SCG circuitry; first accumulator circuitry comprising an input and an output, where the output of the first digital mixer circuitry is coupled to the input of the first accumulator; second accumulator circuitry comprising an input and an output, where the output of the second digital mixer circuitry is coupled to the input of the second accumulator; first digital multiplier circuitry comprising a first input, a second input, and an output, where the first input of the first digital multiplier circuitry is coupled to the output of the first accumulator circuitry, and where the second input of the first digital multiplier circuitry is coupled the first output of the SCG circuitry; second digital multiplier circuit comprising a first input, a second input, and an output, where the first input of the second digital multiplier circuitry is coupled to the output of the second accumulator circuitry, and where the second input of the second digital multiplier circuitry is coupled the second output of the SCG circuitry; and signal combiner circuitry comprising a first input, a second input, and an output, where the first input is coupled to the output of the first digital multiplier circuitry, and where the second input is coupled to the output of the second digital multiplier circuitry.

Example 15 includes the RFOG of Example 14, wherein the differential harmonic correction circuitry further comprises adder circuitry configured to combine the output of each error reduction circuit.

Example 16 includes the RFOG of any of Examples 11-15, each of the first resonance tracking servo circuitry and the second resonance tracking servo circuitry comprise: a resonance tracking analog to digital converter (ADC) circuitry configured to receive the first electrical signal and to digitize the first electrical signal; first digital demodulator circuitry comprising an input, a first input, and a second input, and configured to receive the digitized first electrical signal at the first input of the first digital demodulator, and to receive a common modulation frequency at the second input of the first digital demodulator circuitry; gain circuitry comprising an input and an output, where the input of the gain circuitry is coupled to the output of the first digital demodulator circuitry; resonance tracking (RT) accumulator circuitry comprising an input and an output, where the input of the RT accumulator circuitry is coupled to the output of the gain circuitry; and direct digital synthesizer (DDS) circuitry comprising an input and an output, where the input of the DDS circuitry is coupled to the output of the RT accumulator circuitry.

Example 17 includes the RFOG of Example 16, wherein each of the first resonance tracking servo circuitry and the second resonance tracking servo circuitry further comprises: RT servo adder circuitry comprising an output coupled to the input of the DDS circuitry, and a first input; and RT numerically controlled oscillator coupled to the first input and configured to provide common resonance tracking modulation.

Example 18 includes the RFOG of Example 17, wherein each of the first resonance tracking servo circuitry and the second resonance tracking servo circuitry further comprises a second digital demodulator comprising a first input, a second input, and an output, and configured to receive the digitized first electrical signal at the first input of the second digital demodulator, and to receive a signal having a frequency of twice sideband heterodyne detection (SHD) frequency; and SHD numerically controlled oscillator; wherein the RT servo adder circuitry further comprises a second input coupled to the SHD numerically controlled oscillator.

Example 19 includes the RFOG of any of Examples 16-18, further comprising a RT servo adder circuitry comprising an output coupled to the input of the DDS circuitry, and a first input configured to receive the at least one error cancellation signal from the differential harmonic correction circuitry.

Example 20 includes the RFOG of any of Examples 16-19, further comprising a common resonance tracking modulation (CRTM) generator configured to generate an analog common resonance tracking modulation signal; and wherein the integrated photonics circuitry further comprises a phase modulator configured to phase modulate the master optical signal provided to the first OPLL circuitry and the second OPLL circuitry.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system for diminishing differential harmonics of common resonance tracking modulation in a resonant fiber optic gyroscope (RFOG), comprising:
   beat note servo circuitry configured to receive an electrical beat note signal and to generate at least one differential harmonic alternating current (AC) error signal, where the at least one differential harmonic AC error signal is generated using the electrical beat note signal, where the electrical beat note signal is created from a beat note of a first optical signal generated by a first optical laser and a second optical signal generated by a second laser, where the first optical signal and the second optical signal are modulated with the common resonance tracking modulation, where the first optical signal circulates in a first direction in a resonator of the RFOG, and where the second optical signal circulates in a second direction in the resonator of the RFOG that is opposite the first direction;
   differential harmonic correction circuitry configured to generate at least one error cancellation signal, where each error cancellation signal is generated using a corresponding differential harmonic AC error signal, and where each error cancellation signal and its corresponding differential harmonic AC error signal correspond to a differential harmonic selected to be diminished; and
   adder circuitry configured to add the at least one error cancellation signal to an offset frequency signal to the differential harmonics, where the offset frequency signal comprises a frequency used to tune a carrier frequency of one of the first optical signal and the second optical signal to a resonant frequency in respectively one of the first direction and the second direction;
   wherein each differential harmonic of the common resonance tracking modulation is a vectoral difference between a harmonic of the common resonance tracking modulation of the first optical signal and a same harmonic of the common resonance tracking modulation of the second optical signal, and where a harmonic may be a fundamental frequency.

2. The system of claim 1, wherein the beat note servo circuitry is further configured to generate a beat note frequency.

3. The system of claim 1, wherein the beat note servo circuitry comprises:
   beat note (BN) analog to digital converter (ADC) circuitry comprising an input and an output, where the output of the BN ADC circuitry is configured to receive and digitize the electrical beat note signal;
   BN digital mixer circuitry comprising a first input, a second input, and an output, where the first input of the BN digital mixer circuitry is configured to receive the electrical beat note signal, which has been digitized, from the BN ADC circuitry, and where the output of the BN digital mixer circuitry is configured to generate the at least one differential harmonic AC error signal;
   digital loop filter circuitry comprising an input and an output, where the input of the digital loop filter circuitry is coupled to the output of the BN digital mixer circuitry; and
   a BN numerically controlled oscillator (NCO) comprising an input and an output, where the input of the BN NCO is coupled to the output of the digital loop filter circuitry, and where the output of the BN NCO is coupled to the second input of the BN digital mixer circuitry.

4. The system of claim 3, wherein the output of the digital loop filter circuitry is configured to be generate a beat note frequency.

5. The system of claim 1, further comprising a transimpedance amplifier coupled to an input of the beat note (BN)

servo circuitry and configured to convert the electrical beat note signal from a current signal to a voltage signal.

6. The system of claim 1, wherein the differential harmonic correction circuitry comprises at least one error reduction circuit configured to generate an error cancellation signal using a differential harmonic AC error signal for a differential harmonic selected to be cancelled; and wherein each error reduction circuit comprises:
sine-cosine signal generator (SCG) circuitry comprising a first output configured to provide a sine signal and second output configured to provide a cosine signal at a same frequency;
first digital mixer circuitry comprising a first input, a second input, and an output, where the first input of the first digital mixer circuitry is configured to receive the at least one differential harmonic AC error signal, and where the second input of the first digital mixer circuitry is coupled to the first output of the SCG circuitry;
second digital mixer circuitry comprising a first input, a second input, and an output, where the first input of the second digital mixer circuitry is configured to receive the at least one differential harmonic AC error signal, and where the second input of the second digital mixer circuitry is coupled to the first output of the SCG circuitry;
first accumulator circuitry comprising an input and an output, where the output of the first digital mixer circuitry is coupled to the input of the first accumulator circuitry;
second accumulator circuitry comprising an input and an output, where the output of the second digital mixer circuitry is coupled to the input of the second accumulator circuitry;
first digital multiplier circuitry comprising a first input, a second input, and an output, where the first input of the first digital multiplier circuitry is coupled to the output of the first accumulator circuitry, and where the second input of the first digital multiplier circuitry is coupled the first output of the SCG circuitry;
second digital multiplier circuitry comprising a first input, a second input, and an output, where the first input of the second digital multiplier circuitry is coupled to the output of the second accumulator circuitry, and where the second input of the second digital multiplier circuitry is coupled the second output of the SCG circuitry; and
signal combiner circuitry comprising a first input, a second input, and an output, where the first input is coupled to the output of the first digital multiplier circuitry, and where the second input is coupled to the output of the second digital multiplier circuitry.

7. The system of claim 6, wherein the differential harmonic correction circuitry further comprises adder circuitry configured to combine the output of each error reduction circuit.

8. A method for diminishing differential harmonics of common resonance tracking modulation in a resonant fiber optic gyroscope (RFOG), comprising:
modulating the common resonance tracking modulation on a first optical signal and a second optical signal;
receiving an electrical beat note signal, where the electrical beat note signal is created from a beat note of the first optical signal generated by a first optical laser and the second optical signal generated by a second laser;
generating at least one differential harmonic alternating current (AC) error signal;
generating at least one error cancellation signal, where each error cancellation signal is generated using a corresponding differential harmonic AC error signal, and where each error cancellation signal and its corresponding differential harmonic AC error signal correspond to a differential harmonic selected to be diminished; and
adding the at least one error cancellation signal to an offset frequency signal to the differential harmonics, where the offset frequency signal comprises a frequency used to tune a carrier frequency of one of the first optical signal and the second optical signal to a resonant frequency in respectively one of a first direction and a second direction;
wherein each differential harmonic of the common resonance tracking modulation is a vectoral difference between a harmonic of the common resonance tracking modulation of the first optical signal and a same harmonic of the common resonance tracking modulation of the second optical signal, and where a harmonic may be a fundamental frequency.

9. The method of claim 8, further comprising digitizing the electrical beat note signal, where the at least one differential harmonic AC error signal is generated with the electrical beat note signal which has been digitized.

10. The method of claim 8, further comprising converting the electrical beat note signal from a current signal to a voltage signal.

11. A resonant fiber optic gyroscope (RFOG) configured to diminish differential harmonics of common resonance tracking modulation, comprising:
an optical fiber coil comprising a first port and a second port;
optical bench circuitry comprising a first input, a second input, a first port, a second port, a first output, a second output, and a third output, and where the first port and the second port of the optical bench circuitry are configured to be coupled respectively to the first port and the second port of the optical fiber coil, and further configured to generate a first electrical signal, a second electrical signal, and a Pound-Drever-Hall (PDH) electrical signal, where the PDH electrical signal has an amplitude that varies based upon a differential phase of a first optical signal being injected into the optical fiber coil and the first optical signal circulating in the optical fiber coil;
PDH servo circuitry comprising an input and an output, where the input is configured to receive the PDH electrical signal;
a master laser comprising an input configured to be coupled to the output of the PDH servo circuitry, and configured to generate a master optical signal;
a first slave laser configured to generate the first optical signal modulated by the common resonance tracking modulation which circulates in the optical fiber coil in a first direction;
a second slave laser configured to generate a second optical signal modulated by the common resonance tracking modulation which circulates in the optical fiber coil in a second direction, where the first direction is opposite the second direction;
first optical phase lock loop (OPLL) circuitry configured to receive the first optical signal and the master optical signal;
second OPLL circuitry configured to receive the second optical signal and the master optical signal and to provide a second OPLL signal to the second slave laser;

an integrated photonics circuitry coupled to the first slave laser and configured to receive the first optical signal, coupled to the second slave laser and configured to receive the second optical signal, coupled to the master laser and configured to receive the master optical signal, coupled to the first OPLL circuitry and configured to provide the first optical signal and the master optical signal to the first OPLL circuitry, coupled to the second OPLL circuitry and configured to provide the second optical signal and the master optical signal to the second OPLL circuitry, configured to provide the first optical signal and the master optical signal to the first input of the optical bench circuitry, and configured to provide the second optical signal to the second input of the optical bench circuitry;

beat note servo circuitry configured to receive an electrical beat note signal and to generate at least one differential harmonic alternating current (AC) error signal and to generate a beat note frequency, where the at least one differential harmonic AC error signal is generated using the electrical beat note signal, where the electrical beat note signal is created from a beat note of the first optical signal generated by the first optical laser and the second optical signal generated by the second laser, where the first optical signal circulates in the first direction in a resonator of the RFOG, and where the second optical signal circulates in the second direction in the resonator of the RFOG that is opposite the first direction, where the resonator is formed by the optical fiber coil and a portion of the optical bench circuitry;

rate calculation circuitry coupled to the beat note servo circuitry and configured to receive the beat note frequency and to determine a rate of rotation of the optical fiber coil around a center axis;

differential harmonic correction circuitry configured to generate at least one error cancellation signal, where each error cancellation signal is generated using a corresponding differential harmonic AC error signal, and where each error cancellation signal and its corresponding differential harmonic AC error signal correspond to a differential harmonic selected to be diminished;

first resonance tracking servo circuitry configured to receive the first electrical signal generated by the optical bench circuitry used to generate a first offset frequency signal comprising a frequency used to tune a carrier frequency of the first optical signal generated by the first slave laser to a resonant frequency in the first direction; and second resonance tracking servo circuitry configured to receive the second electrical signal generated by the optical bench circuitry used to generate a second offset frequency signal comprising a frequency used to tune a carrier frequency of the second optical signal generated by the second slave laser to a resonant frequency in the second direction, and to receive the at least one error cancellation signal;

wherein each differential harmonic of the common resonance tracking modulation is a vectoral difference between a harmonic of the common resonance tracking modulation of the first optical signal and a same harmonic of the common resonance tracking modulation of the second optical signal, and where a harmonic may be a fundamental frequency.

12. The RFOG of claim 11, wherein the beat note servo circuitry comprises:

beat note (BN) analog to digital converter (ADC) circuitry comprising an input and an output, where the output of the BN ADC circuitry is configured to receive and digitize an electrical beat note signal;

BN digital mixer circuitry comprising a first input, a second input, and an output, where the first input of the BN digital mixer circuitry is configured to receive the electrical beat note signal, which has been digitized, from the BN ADC circuitry, and where the output of the BN digital mixer circuitry is configured to generate the at least one differential harmonic AC error signal;

digital loop filter circuitry comprising an input and an output, where the input of the digital loop filter circuitry is coupled to the output of the BN digital mixer circuitry, where the output of the digital loop filter circuitry is configured to be generate a beat note frequency; and a BN numerically controlled oscillator (NCO) comprising an input and an output, where the input of the BN NCO is coupled to the output of the digital loop filter circuitry, and where the output of the BN NCO is coupled to the second input of the BN digital mixer circuitry.

13. The RFOG of claim 11, further comprising a transimpedance amplifier coupled to an input of the beat (BN) servo circuitry and configured to convert the electrical beat note signal from a current signal to a voltage signal.

14. The RFOG of claim 11, wherein the differential harmonic correction circuitry comprises at least one error reduction circuit configured to generate an error cancellation signal using a differential harmonic AC error signal for a differential harmonic selected to be cancelled; and wherein each error reduction circuit comprises:
sine-cosine signal generator (SCG) circuitry comprising a first output configured to provide a sine signal and second output configured to provide a cosine signal at a same frequency;

first digital mixer circuitry comprising a first input, a second input, and an output, where the first input of the first digital mixer circuitry is configured to receive the at least one differential harmonic AC error signal, and where the second input of the first digital mixer circuitry is coupled to the first output of the SCG circuitry;

second digital mixer circuitry comprising a first input, a second input, and an output, where the first input of the second digital mixer circuitry is configured to receive the at least one differential harmonic AC error signal, and where the second input of the second digital mixer circuitry is coupled to the first output of the SCG circuitry;

first accumulator circuitry comprising an input and an output, where the output of the first digital mixer circuitry is coupled to the input of the first accumulator circuitry;

second accumulator circuitry comprising an input and an output, where the output of the second digital mixer circuitry is coupled to the input of the second accumulator circuitry;

first digital multiplier circuitry comprising a first input, a second input, and an output, where the first input of the first digital multiplier circuitry is coupled to the output of the first accumulator circuitry, and where the second input of the first digital multiplier circuitry is coupled the first output of the SCG circuitry;

second digital multiplier circuitry comprising a first input, a second input, and an output, where the first input of the second digital multiplier circuitry is coupled to the output of the second accumulator circuitry, and where the second input of the second digital multiplier circuitry is coupled the second output of the SCG circuitry; and signal combiner circuitry comprising a first input, a second input, and an output, where the first input is coupled to the output of the first digital multiplier circuitry, and where the second input is coupled to the output of the second digital multiplier circuitry.

15. The RFOG of claim 14, wherein the differential harmonic correction circuitry further comprises adder circuitry configured to combine the output of each error reduction circuit.

16. The RFOG of claim 11, each of the first resonance tracking servo circuitry and the second resonance tracking servo circuitry comprise:

resonance tracking analog to digital converter (ADC) circuitry configured to receive the first electrical signal and to digitize the first electrical signal;

first digital demodulator circuitry comprising an output, a first input, and a second input, and configured to receive the first electrical signal, which has been digitized, at the first input of the first digital demodulator circuitry, and to receive a common modulation frequency at the second input of the first digital demodulator circuitry;

gain circuitry comprising an input and an output, where the input of the gain circuitry is coupled to the output of the first digital demodulator circuitry;

resonance tracking (RT) accumulator circuitry comprising an input and an output, where the input of the RT accumulator circuitry is coupled to the output of the gain circuitry; and direct digital synthesizer (DDS) circuitry comprising an input and an output, where the input of the DDS circuitry is coupled to the output of the RT accumulator circuitry.

17. The RFOG of claim 16, wherein each of the first resonance tracking servo circuitry and the second resonance tracking servo circuitry further comprises:

RT servo adder circuitry comprising an output coupled to the input of the DDS circuitry, and a first input; and a RT numerically controlled oscillator coupled to the first input and configured to provide the common resonance tracking modulation.

18. The RFOG of claim 17, wherein each of the first resonance tracking servo circuitry and the second resonance tracking servo circuitry further comprises a second digital demodulator comprising a first input, a second input, and an output, and configured to receive the first electrical signal, which has been digitized, at the first input of the second digital demodulator, and to receive a signal having a frequency of twice sideband heterodyne detection (SHD) frequency at the second input of the second digital demodulator; and a SHD numerically controlled oscillator;

wherein the RT servo adder circuitry further comprises a second input coupled to the SHD numerically controlled oscillator.

19. The RFOG of claim 16, further comprising a RT servo adder circuitry comprising an output coupled to the input of the DDS circuitry, and a first input configured to receive the at least one error cancellation signal from the differential harmonic correction circuitry.

20. The RFOG of claim 16, further comprising a common resonance tracking modulation (CRTM) generator configured to generate an analog common resonance tracking modulation signal; and wherein the integrated photonics circuitry further comprises a phase modulator configured to phase modulate the master optical signal provided to the first OPLL circuitry and the second OPLL circuitry.

* * * * *